United States Patent Office 2,767,203
Patented Oct. 16, 1956

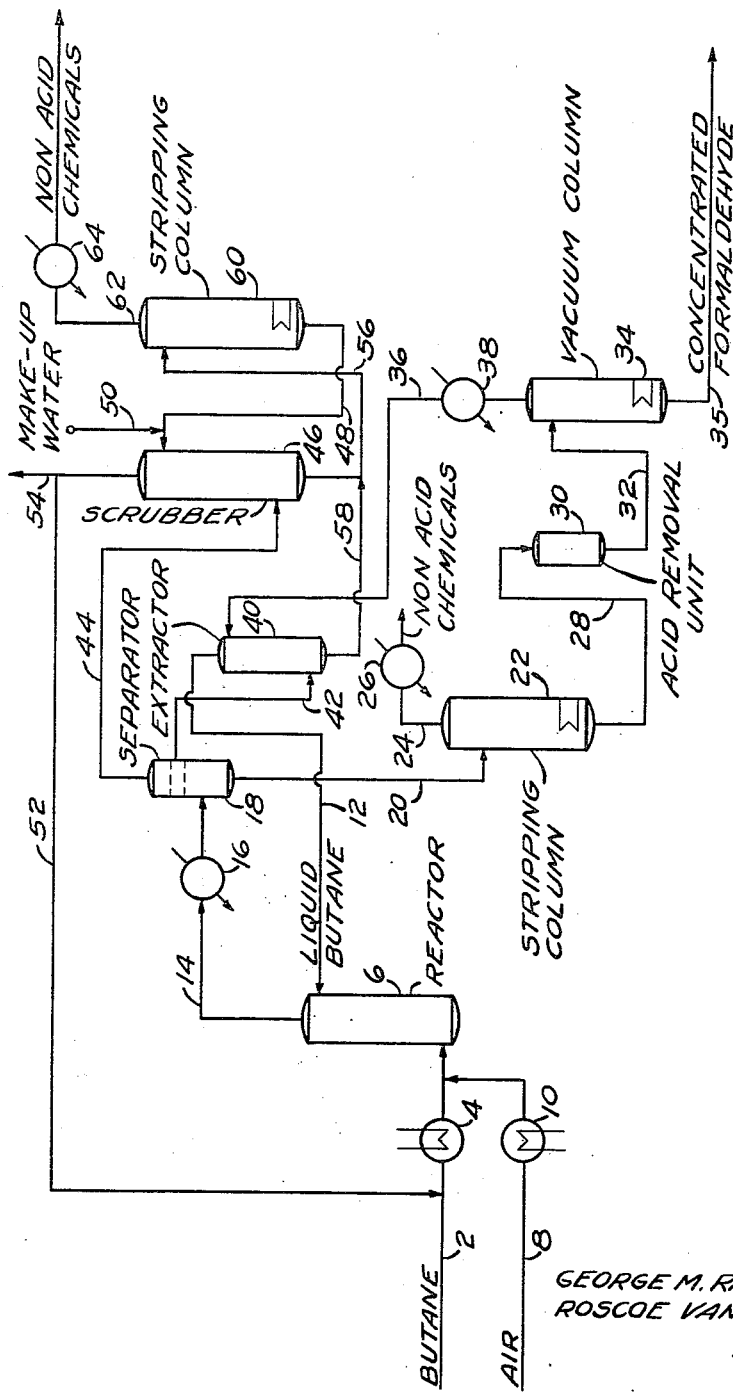

2,767,203

PROCESS FOR PARTIAL OXIDATION OF HYDROCARBONS

George M. Rambosek, St. Paul, Minn., and Roscoe F. Vandaveer, Tulsa, Okla., assignors to Stanolind Oil and Gas Company, Tulsa, Okla., a corporation of Delaware Application November 6, 1953, Serial No. 390,496

5 Claims. (Cl. 260—451)

The present invention relates to the partial oxidation of hydrocarbons. More particularly, it is concerned with a procedure for conducting the aforesaid oxidation under conditions which permit more efficient recovery of the resulting products of oxidation.

In the partial oxidation of hydrocarbons, such reaction is usually conducted in the vapor phase; streams of oxygen-containing gas and hydrocarbon being separately preheated up to or slightly below the threshold temperature of the reaction prior to the introduction of said gases into a suitable reaction zone. The reaction itself becomes highly exothermic once the critical temperature required to initiate the oxidation has been reached and, accordingly, it is generally necessary to limit the extent of conversion (by controlling the amount of oxygen in the reaction mixture) in order to maintain the temperature within the reaction zone at the aforesaid critical level. Once the desired oxidation products are formed, they should be withdrawn from the reaction zone as rapidly as possible because of their tendency to decompose into less desirable products on continued exposure to high temperatures. This object is generally accomplished by the use of a quenching step, i. e., the supplying of conditions which lower the temperature of the oxidation products to a level at which they are stable. In the past, the principal quenching agent for this purpose has been water or dilute aqueous solutions of certain chemicals derived from various separation stages of the product processing operation. While these methods served to bring the temperature of the product chemicals down to a level at which such chemicals were stable, the latter were obtained in extremely dilute solutions, e. g., 1 to 5 percent, thereby necessitating expensive processing steps and relatively large-sized equipment to accomplish satisfactory concentration and purification of said chemical.

Accordingly, it is an object of our invention to perform the aforesaid quenching operation in a manner such that expensive processing steps and over-sized separation equipment are avoided. It is another object of our invention to provide a method whereby the overall operation of partial oxidation, separation and purification can be effected with a minimum of process water.

In accomplishing the foregoing, as well as other objects, a suitable hydrocarbon—or mixtures thereof—in liquid form is employed as a quenching agent. The use of a hydrocarbon quench has the advantage that the resulting chemical product streams are not diluted. Also, the solubility of the chemicals produced is relatively low in the hydrocarbon. This means that the concentration of chemicals in the product water layer produced in the partial oxidation of hydrocarbons may be maintained at about 60 to 65 percent, instead of a concentration of about 1 to 5 percent when water is used as the quenching agent.

In carrying out the process of our invention we generally prefer to employ a feed stock containing normally gaseous paraffin hydrocarbons or olefins such as those present in petroleum refinery gases. Natural gas or normally gaseous hydrocarbons recovered from the adsorption towers of a natural gasoline plant may likewise be employed. The hydrocarbon is first preheated—usually to a temperature of from about 300° to 600° F.—and thereafter combined with a stream of oxygen or a suitable oxygen-containing gas that has likewise been separately preheated to a temperature of from 300° to 600° F., and the resulting mixture passed to a reactor where the reaction is allowed to proceed adiabatically until a temperature of about 800° or 900° F. is reached.

Quenching of the hot reaction products may be effected either by injecting the hydrocarbon—preferably in liquid form—as a spray or mist at a point near the exit end of the reaction zone, or the products may be withdrawn from the reaction zone and quenched with hydrocarbon in a separate quenching chamber. By either means the bulk of the reaction products is reduced to a temperature at which the products are stable without being diluted to any appreciable extent with quenching agent. On further cooling of the quenched products, a two-phase liquid mixture consisting of an upper hydrocarbon layer and a lower aqueous phase of chemicals is obtained, the water present being only that amount produced in the partial oxidation step. Because of the formation of a two-phase mixture at this stage of our process, separation of the quenching agent from the produced chemicals is no problem. Thus, in instances where a hydrocarbon such as butane is used as the quenching agent, the total condensate may be withdrawn from the system, the butane separated therefrom in liquid form and returned to the quenching step. The pressure employed in the product separator in which the aforesaid two-phase mixture is collected may vary rather widely. However, in order to simplify the overall operation, we generally—where possible—try to maintain the separator at essentially the same pressure as is employed in the reaction zone. In this regard, the separator is ordinarily maintained at or slightly below atmospheric temperature. In the event the pressure and temperature of the product separator are not sufficient to bring about condensation of the butane or other hydrocarbon quenching material employed, the product gases may be cooled further and/or compressed to recover the quench material in the liquid state. Separation of the hydrocarbon quenching agent in liquid form necessarily involves solution of product chemicals to a limited extent and, in some instances, it may be desirable to remove these chemicals from the quenching agent before returning the latter to the quenching step. This object may be accomplished by means of extraction, scrubbing or distillation.

The feed employed in the process of our invention should generally be on the hydrocarbon-rich side, i. e., from about 30 to 80 percent hydrocarbon or more and from about 2 to about 10 percent oxygen. While preheat temperatures for the main feed streams to the reaction zone usually range from about 300° to about 600° F., lower or higher preheat temperatures may be employed depending primarily on the composition of the total feed. Thus, when employing a hydrocarbon-rich feed, it has been observed that the involved reaction is more readily initiated at higher concentrations of oxygen and, hence, can be effected at a lower temperature. For example, with total feeds having a composition within the range mentioned above, the preheat required may be from about 300° to about 400° F. Such preheat temperatures apply to operation in the normal pressure range—from about 25 to 200 p. s. i. g. The preheat temperatures required will be somewhat higher at operating pressures below the aforesaid normal range and will be somewhat lower at operating pressures above normal.

Recycle ratios of separator tail gas to fresh feed may vary widely, with ratios of from about 1 to 1 to about 20 to 1 being ordinarily preferred. If desired, however, higher recycle ratios may be employed. Pressures at which the reaction is effected likewise may vary and generally may range from about atmospheric to about 1500 p. s. i. g.; however, as indicated above, pressures of from about 25 to 200 p. s. i. g. are ordinarily preferred. Contact times in the reaction zone may range from about 0.1 to about 10 seconds; however, we normally prefer to employ times ranging from about 0.5 to about 1.5 seconds.

The process of our invention may be further illustrated by reference to the accompanying drawing wherein butane, under pressure of about 100 p. s. i. g.—in line 2 —passes through heat exchanger 4, where the butane is preheated to a temperature of about 500° F. Prior to the introduction of butane into reactor 6 air in line 8—also under pressure of about 100 p. s. i. g.—is passed through heat exchanger 10 and preheated to about 500° F. These separately heated streams are then combined and introduced into reactor 6 where reaction of the gaseous components is initiated, generating a temperature not substantially in excess of about 900° F. The oxygen present in the reaction mixture is substantially completely consumed, and as the mixture proceeds upwardly toward the exit end of the reactor butane—at 80° F. and at a pressure slightly in excess of that prevailing in the reactor— is introduced in the form of a fine spray through line 12. The quenched product gases withdrawn through line 14 are reduced in temperature to a value of about 300° F. Further cooling of the gases is effected in condenser 16 and the resulting liquid condensate taken to separator 18, where it stratifies into two layers. The lower aqueous layer containing the bulk of the product chemicals is withdrawn through line 20 and sent to stripping column 22, operated at about 65° C., where the major portion of the non-acid chemicals—with the exception of formaldehyde—is taken overhead through line 24 and condenser 26. The bottoms in column 22 consists primarily of formaldehyde, water-soluble acids and water, and is taken from the colume via line 28 to an anionic exchange resin bed in acid removal unit 30 where the acids are separated from the aforesaid aqueous solution. The resulting substantially acid-free aqueous solution of formaldehyde is next taken through line 32 to column 34, operated under a vacuum of about 50 to 100 ml., yielding an aqueous bottoms in line 35 containing about 85 percent formaldehyde. The overhead from this distillation step, consisting essentially of water, is withdrawn through line 36 and condenser 38 and introduced into extraction column 40 where said overhead is employed to wash water-soluble chemicals from a rising stream of liquid butane withdrawn from separator 18 through line 42. Water-washed butane at about 80° F. is then returned through line 12 to the quenching operation previously mentioned. Uncondensed gases in separator 18 are taken off through line 44 and washed in scrubbing tower 46 by means of a dilute aqueous solution of water-soluble chemicals added through line 48. Make-up water may be added through line 50. Gases issuing from the top of tower 46 consist essentially of hydrocarbons and may be recycled back to line 2 via line 52. A portion of this gas may, if desired, be vented to the atmosphere through line 54 or—if expedient—may be used as plant fuel. The water scrubbings from tower 46 are withdrawn through line 56, combined with the aqueous extract in line 58 from extraction column 40 and introduced into stripping column 60 where an aqueous distillate of water-soluble chemicals is taken off through line 62 and condenser 64. The stream in line 62 may be combined with the overhead in line 24 and the resulting mixture further purified in accordance with known methods.

It will be apparent from the foregoing discussion that we have provided a procedure for effectively quenching the hot gaseous products resulting from the partial oxidation of hydrocarbons, which procedure eliminates a very appreciable portion of the expenses entailed in the recovery of the crude mixtures produced by such partial oxidation process. Likewise, it will be apparent that the process of our invention is susceptible of numerous changes and modifications without departing from the scope thereof. For example, hydrocarbon oxidation products produced by the action of sulfur oxides on light hydrocarbons—as described in U. S. 2,590,124 to Reeder — may be quenched in accordance with the process of our invention.

We claim:

1. In a process for the partial oxidation of a normally gaseous hydrocarbon with an oxygen containing gas in a reaction zone at a temperature not substantially in excess of about 900° F. and wherein the resulting products of oxidation, constituting substantially the only products from said zone, are subjected to a quenching step; the improvement which comprises employing a normally gaseous hydrocarbon in liquid form as the quenching agent in said step.

2. The process of claim 1 in which the quenching agent is selected from the group consisting of propane and butane.

3. In a process for the partial oxidation of a normally gaseous hydrocarbon with an oxygen containing gas in a reaction zone at a temperature not substantially in excess of about 900° F. and wherein the resulting products of oxidation, constituting substantially the only products from said zone, are subjected to a quenching step; the improvement which comprises employing as the quenching agent an additional quantity of said normally gaseous hydrocarbon in liquid form as the quenching agent.

4. In a process for the partial oxidation of hydrocarbons with an oxygen-containing gas wherein the resulting products of oxidation are subjected to a quenching step and thereafter condensing the resulting quenched products to produce a gas phase and a liquid product phase, the improvement which comprises quenching said products with a hydrocarbon in liquid form, subjecting said quenched oxidation products to a condensation step to produce an oil phase and a liquid water phase in addition to said gas phase, subjecting the latter to a scrubbing operation 1 with an aqueous solvent, hereinafter identified, for the water-soluble chemicals in said gas phase, subjecting said liquid water phase to distillation 2 to separate non-acid chemicals other than formaldehyde therefrom, removing water-soluble carboxylic acids from the aqueous formaldehyde-containing bottoms produced in said distillation step 2, thereafter subjecting the resulting acid-free aqueous formaldehyde solution to distillation under vacuum, subjecting said oil phase to extraction with the distillate from said vacuum distillation step, combining the resulting aqueous extract with the scrubbings from scrubbing operation 1, subjecting the resulting aqueous mixture to distillation to remove overhead non-acid chemicals other than formaldehyde and employing the aqueous bottoms thus obtained as a scrubbing medium for said scrubbing operation 1.

5. The process of claim 4 in which butane is employed as the hydrocarbon quenching agent.

References Cited in the file of this patent

UNITED STATES PATENTS

| 2,299,790 | Bludworth | Oct. 27, 1942 |
| 2,394,849 | Dumani et al. | Feb. 12, 1946 |
| 2,410,642 | Farkas et al. | Nov. 5, 1946 |
| 2,668,791 | Holland | Feb. 9, 1954 |